United States Patent [19]

Palate et al.

[11] Patent Number: 5,264,493
[45] Date of Patent: Nov. 23, 1993

[54] PROCESS FOR THE TREATMENT OF POLYPROPYLENE

[75] Inventors: Claude Palate, Ferrara, Italy; Alain M. F. Prevot, Fecamp, France; Rene Venneman, Aiseau-Presle, Belgium

[73] Assignee: Fina Research, S.A., Belgium

[21] Appl. No.: 26,082

[22] Filed: Mar. 4, 1993

Related U.S. Application Data

[63] Continuation of Ser. No. 794,700, Nov. 20, 1991, abandoned, which is a continuation of Ser. No. 312,665, Feb. 21, 1989, abandoned.

[30] Foreign Application Priority Data

Feb. 19, 1988 [FR] France ............... 88 02018

[51] Int. Cl.$^5$ ............................... C08F 8/50
[52] U.S. Cl. ............................ 525/194; 525/198; 525/240
[58] Field of Search ............... 525/194, 198, 240

[56] References Cited

U.S. PATENT DOCUMENTS

| | | | |
|---|---|---|---|
| 3,013,003 | 12/1961 | Maragliano et al. | 525/194 |
| 3,755,227 | 8/1973 | Gray et al. | 524/536 |
| 3,887,534 | 6/1975 | Baba et al. | 525/387 |
| 4,247,652 | 1/1981 | Matsuda et al. | 525/211 |
| 4,342,844 | 8/1982 | Torenbeek et al. | 525/387 |
| 4,451,589 | 5/1984 | Morman et al. | 525/387 |
| 4,710,317 | 12/1987 | Tabata et al. | 524/583 |
| 4,833,195 | 5/1989 | Adur et al. | 525/194 |
| 4,940,736 | 7/1990 | Alteepping et al. | 521/81 |

FOREIGN PATENT DOCUMENTS 1407356 9/1975 United Kingdom .
2100268 12/1982 United Kingdom .

OTHER PUBLICATIONS

*Rubber Technology*, edited by Maurice Morton, Third Ed., Van Nostrand Reinhold, N.Y., 1987, pp. 260–263.

*Primary Examiner*—Joseph L. Schofer
*Assistant Examiner*—R. H. Delmendo
*Attorney, Agent, or Firm*—Roger W. Parkhurst; John K. Abokhair; M. Norwood Cheairs

[57] ABSTRACT

Isotactic polypropylene and/or ethylene-propylene copolymers are blended with 5–65 wt % of atactic polypropylene and up to 20 wt % of the total blend of a thermosensitive agent. The process is particularly adapted for the incorporation of prodegradents used for reducing the molecular weight and its distribution, thereby producing polyethylene particularly suitable for fiber or film formation.

14 Claims, No Drawings

PROCESS FOR THE TREATMENT OF POLYPROPYLENE

This is a continuation of application Ser. No. 07/794,700 -filed Nov. 20, 1991, now abandoned, which in turn is a continuation of application Ser. No. 07/312,665 filed Feb. 21, 1989, now abandoned.

BACKGROUND

The present invention relates to a process for the treatment of polypropylene with products which are degraded by heat, for forming polypropylene pellets containing such a thermosensitive agent substantially unaffected. The present invention also relates to a process for treating polypropylene to incorporate therein a significant amount of a thermosensitive agent.

More particularly, the present invention relates to a process for the treatment of polypropylene to improve its ability to form fibers or to be formed into fibers.

In addition to applications in the field of fibers, polypropylene treated according to the process of the present invention can be used in other applications such as injection, injection molding or even for the preparation of other compounds and compositions.

It is well known that the ability to form fibers can be achieved with a polypropylene having a narrow molecular weight distribution. Generally, very high molecular weight polypropylenes are produced, which are then degraded chemically or thermally to a certain extent, thus reducing the molecular weight distribution while at the same time reducing the average molecular weight.

Polypropylene is degraded chemically by addition of compounds which decompose into free radicals. Chemical stabilizers added to polypropylene to enhance end-use stability may interfere with free radical generators.

However, it has been found that large free radical generator chemicals, such as the specific types of organic peroxides described in British Patent 1,442,681, are minimally affected by commonly used stabilizers and are thus preferred prodegradents.

The degree to which the polymer can be degraded is limited by the inability of the polymer manufacturer to form pellets from polymers of very low viscosity. Said very low viscosities are necessary in order either to enhance the productivity of extrusion equipment for ultra-fine fibers, or to obtain fibers having specific mechanical characteristics.

Therefore, the polypropylene processor manufacturing films and fibers faces the problem of having to use a polypropylene not optimally suited for these applications. Thus, a need has been demonstrated for a polymer having high viscosity properties for pelletizing purposes, and low viscosity properties for end use processing purposes.

It has already been suggested that the end use processor should add an additional chemical prodegradent to polypropylene pellets to reduce the polymer viscosity to the desired level prior to fiber or film formation. However, there are several disadvantages to this approach:

The peroxide prodegradents are fire/explosion hazards and require special handling procedures and equipment.

To be most effective, the peroxide must be uniformly dispersed within the polymer before it decomposes and reacts, otherwise, a polymer with variable viscosity may result in an heterogeneous weight distribution, which makes impossible any transformation of this polymer into fibers. The polymer producer, having access to specialized apparatus and fine reactor flakes rather than pellets, is in a much better position to achieve the required uniform distribution.

Another disadvantage is that the equipment may be damaged by a variable viscosity polymer.

Peroxides are more efficient as prodegradents if well dispersed before reacting. Peroxide added to the pellets, rather than within them, acts as a lubricant to extruder feed sections reducing throughput for a given rotation rate.

The processor may also reduce the molecular weight by using very high temperatures to thermally degrade the polypropylene. However, use of very high temperatures leads to:
reduced equipment life;
throughput limitations because of quenching restraints;
excessive energy consumption; and
additive problems including: excessive additive degradation, requiring the inclusion of more additive to the polymer than is required in the final product; limited ranges of useable additives, requiring that more expensive or non-optimal additives be used; and, die capillaries and pipes and the like plugging because of the degradation products.

There has also been proposed a process comprising several successive steps of degradation of a polypropylene, with initial manufacture of a polymer which is easily pelletized, the resulting pellets when heated thereafter being submitted to an additional degradation, thereby producing a polymer of lower viscosity, which may be suitably converted into the form of film or fibers of high quality. However, this type of process is limited by the quantity of prodegradent which can be added. Moreover, it has been noticed that this type of process creates a very bad distribution of the prodegradent since it is introduced into the polymer just before the granulation step to reduce the residence time at high temperature to avoid excessive degradation.

BRIEF SUMMARY OF THE INVENTION

An object of the present invention is to overcome all of the aforementioned drawbacks.

It is another object of the present invention to provide a process for treating isotactic polypropylene and-/or ethylene-propylene copolymers, hereinafter generally designated polypropylene, to incorporate therein a significant amount of thermosensitive agent without substantial degradation of that agent during its incorporation.

Another object of the present invention is to provide a process for treating polypropylene which permits incorporation of more than about 10% of prodegradent without degradation thereof.

Still another object of the present invention is to provide a polypropylene containing a substantial amount of prodegradent, having improved extrusion properties.

The process of the present invention for producing isotactic polypropylene and/or ethylene-propylene copolymer (hereinafter simply referred to as polypropylene) having improved spinning properties by incorporating a thermosensitive agent therein, comprises the steps of:

(i) preparing by extrusion an initial homogeneous blend comprising said polypropylene together with from 5% to 65% of atactic polypropylene;

(ii) introducing into the feed hopper of an extruder the blend as prepared in step (i) simultaneously with of a thermosensitive agent in an amount in the range of between about 0.01 and 20% by weight based on the total weight of polymer;

(iii) extruding the blend and introducing it into an extrusion die and then into a granulator to form polypropylene pellets including a thermosensitive agent;

(iv) recovering the polypropylene pellets thus obtained, which pellets include the substantially intact thermosensitive agent.

Thermosensitive agent means any composition which altered in its structure or properties, i.e., chemically or physically, by exposure to a temperature above a certain limit, more specifically in the present case by exposure to the usual processing temperatures for polypropylene.

DETAILED DESCRIPTION

According to a preferred embodiment of the present invention, the polypropylene thus obtained comprises a substantial quantity of a prodegradent agent that will degrade during a subsequent extrusion.

Unexpectedly it has also been discovered that the polypropylene pellets thus formed have properties which make them particularly useful in the manufacture of products by processes which involve formation by various spinning techniques.

According to the process of the present invention, isotactic polypropylene and/or ethylene-propylene copolymer, herein simply called polypropylene, is blended with atactic polypropylene. It is understood that polypropylene may already contain an initial amount of atactic polymer.

Polypropylene is introduced into an extruder, together with atactic polypropylene in an amount in the range of about 5 to about 65% by weight, said amount including any amount of atactic polypropylene already present in the polypropylene starting material. Generally, this blending is carried out in a single step at a temperature of about 180° C. to 240° C., and a very homogeneous blend is obtained. In order to avoid the formation of an excessively fluid product, it is advisable to use not more than about 65% by weight of atactic polypropylene, particularly not more than about 50% by weight in order to limit the melt index to a value of about 200 g/10 min, preferably about 100 g/10 min. (ASTM D-1238-85; manual procedure using 190° C./2.16 kg). The blend is then introduced into an extruder heated according to a temperature profile of 130° C. to 165° C., together with a prodegradent product having a half-life of at least about 1 min at 170° C.

Generally, this prodegradent product will be selected in view of the polypropylene used, and usually will have a half-life in the range of 1 and 5 min at 170° C.

A prodegradent, as used in the art, means a precursor of a degradent agent, i.e., a compound which is not a degradent agent by itself, but which becomes a degradent agent upon activation.

Exemplary prodegradents include, by way of example and not limitation, suitable organic peroxides such as 2,5-dimethyl-2,5-bis(t-butylperoxy)-hexyne-3 and 4-methyl-4-t-butylperoxy-2-pentatanone (e.g., Lupersol TM 130 and Lupersol TM 120 available from Lucidol Division, Pennwalt Corporation), 3,6,6,9,9-pentamethyl-3-(ethyl acetate)-1,2,4,5-textraoxycyclononane (e.g., U.S. Pat. No. 138 from Witco Chemical Corporation), 2,5-dimethyl-2,5-bis-(t-butylperoxy)-hexane (e.g., Lupersol 101) and 1-3-bis-(tert-butylperoxyisopropyl)-benzene (known as Vulcup R, from Hercules, Inc.).

It is understood that the process of the present invention may also be applied to the introduction of other agents which thermally degrade, such as for example, the introduction of up to 20 wt %, based on the weight of polypropylene, of a blowing agent such as azodicarbonamide or mixtures of citric acid and sodium bicarbonate, or of up to 80 wt %, based on the weight of polypropylene, of a fire-retardent agent such as hexabromocyclododecane, 2,3-dibromopropyl pentabromophenol ether or tetrabromobisphenol A bis(2,3-dibromopropylether).

According to the process of the present invention it has been discovered that up to 20%, based on the weight of polypropylene, of such prodegradent agents may be incorporated into the polymer, without any major degradation of said agents. It has also been found that these agents may be directly introduced into the blend of isotactic and atactic polypropylene, in other words, at the beginning of the extrusion, thereby providing significant improvement of the dispersion and homogeneity of the final blend, without increasing the degradation rate of the prodegradent agent. The extrusion of the polymer together with the prodegradent agent is carried out at a temperature in the range of about 130° and 165° C., which avoids strong degradation of the products even using residence times of up to about 90 seconds in the extruder.

The extrusion of this blend may even be carried out in several passes without causing major degradation of the product. It is even advisable to carry out the extrusion in several passes if the amount of prodegradent agent to be introduced exceeds about 10% by weight of the reaction mixture.

At the outlet of the extruder, the blend is passed through a die and then into a pelletizer to recover the pellets of polypropylene filled with substantial amounts of prodegradent agent.

The product thus obtained may also be extruded in admixture with amounts of polypropylene, as herein defined, in order to adjust the desired amount of prodegradent agent in view of the proposed end-use of the treated polypropylene.

Applicant has also discovered that the products obtained in accordance with the present invention, whether or not extruded in admixture with polypropylene, have significantly improved spinning properties, which may be due to the improved dispersion of the prodegradent agent throughout the treated polypropylene.

Particularly, it is possible to obtain in one step, by degradation of pellets of high viscosity, a material of very low viscosity, having a very narrow molecular weight distribution and high homogeneity, which is particularly useful for the production of ultrafine fibers. Such production is not possible with a classical process using materials whose viscosity is so low that it is impossible to properly form the materials into pellets.

Another application of the present invention comprises blending lower amounts of the product usually obtained by the inventive process with isotactic polypropylene, to produce a blended polypropylene particularly suitable for very high speed forming to yarn having low denier. Here too, the very good dispersion of the prodegradent agents within the isotactic polypropylene is of importance and is achieved by in situ dispersion of the prodegrandent agents.

When the process of the invention is applied to the incorporation of a thermosensitive fire-retardent agent, or of a thermosensitive blowing agent, pellets are obtained which are mainly used in the master batch in the extrusion of polypropylene.

The following examples better illustrate the process of the invention, without limiting its scope.

EXAMPLE 1

A blend was prepared comprising atactic polypropylene having a viscosity of 0.5 Pa.s at 180° C. and istoactic polypropylene having a melt flow index of 2.6 g/10 min. Melt flow index values reported herein were determined using the standard procedure ASTM-D-1238-85, that is manual procedure at 190° C./2.16 kg, except as otherwise stated. This blend contained 70% of isotactic polypropylene and was obtained by extrusion in a one screw extruder of 114 mm diameter. The temperature profile in the extruder varied between 190° C. and 220° C. The polymer obtained had a melt flow index of 12 g/10 min.

This blend was introduced into an extruder of 90 mm diameter having three heating zones, together with a peroxide namely 1,3-bis-(tert-butylperoxyisopropyl)-benzene, having a half-life of 2.5 min at 170° C. The temperature profile was 150- 156-148-132° C. and the flow rate was 96 kg/hour. The residence time was 90 seconds.

The blend nominally contained 10.7% by weight of peroxide, and was produced by carrying out a double pass in the extruder. After analysis of the polypropylene pellets, it was determined that 9.5% of the peroxide was present in the blend in its active form.

EXAMPLE 2

A blend was prepared comprising atactic polypropylene having a viscosity of 0.5 Pa.s at 180° C. and isotactic polypropylene having a melt flow index of 2.6 g/10 min. This blend contained 70% of isotactic polypropylene and was obtained by extrusion in a one screw extruder of 114 mm diameter. The temperature profile in the extruder varied between 190° C. and 220° C. The polymer obtained had a melt flow index of 12 g/10 min.

This blend was introduced into an extruder of 90 mm diameter having three heating zones, together with a peroxide namely 1,3-bis-(tert-butylperoxyisopropyl)-benzene, having a half-life of 2.5 min at 170° C. The temperature profile was 150-156-148-132° C. and the flow rate was 96 kg/hour. The residence time was 90 seconds.

The blend nominally contained 14.7% by weight of peroxide, and was produced by carrying out a double pass in the extruder. After analysis of the polypropylene pellets, it was determined that 13.5% of the peroxide was present in the blend in its active form.

COMPARATIVE EXAMPLE

Isotactic polypropylene having a melt flow index of 25 g/10 min was used. This polymer was introduced into the feed hopper of an extruder having 90 min diameter, together with a peroxide, namely 1,3-bis(tert-butylperoxyisopropyl)-benzene, having a half-life of 2.5 min at 170° C. The temperature profile in the extruder was 150-182-176-160-164° C. The flow rate was 115 kg/hour. The residence time was 75 seconds. The nominal amount of peroxide introduced was 5%. However, it was impossible to continue the extrusion because the resultant material came out of the die expended and white due to partial degradation of the peroxide. It was also observed after some time that the polymer was experiencing a significant increase in temperature in the extruder and a very significant degradation of the peroxide was occurring. However, in the polymer so formed, only 1.5% of the peroxide was still present in its active form.

The experiment was repeated, but this time attempting to introduce the peroxide into the extruder immediately before the extruder die. The dispersion was bad and moreover the product obtained had an active peroxide content of only 2.8%.

EXAMPLE 3

A blend was prepared comprising atactic polypropylene having a viscosity of 1500 Pa.s at 180° C. and isotactic polypropylene having a melt flow index of 2.6 g/10 min. This blend contained 50% isotactic polypropylene and was obtained by extrusion in a one screw extruder of 114 mm diameter. The temperature profile in the extruder varied between 220-200-220° C. The polymer obtained had a melt flow index of 10 g/10 min. The flow rate of the extruder was 250 kg/hour.

This blend was introduced into an extruder of 90 mm diameter having three heating zones, together with a peroxide, namely 1,3-bis-(tert-butylperoxyisopropyl)-benzene, having a half-life of 2.5 min at 170° C. The temperature profile was 150-156-148-132° C. and the flow rate was 96 kg/hour. The residence time was 90 seconds.

The blend nominally contained 10.7% by weight of peroxide, and was produced by carrying out a double pass in the extruder. After analysis of the polypropylene pellets, it was determined that 9.5% of the peroxide was present in the blend in its active form.

EXAMPLE 4

A blend was formed with 2.5 parts of the blend of polypropylene and peroxide prepared as in Example 1, with 97.5 parts of isotactic polypropylene having a melt flow index of 12 g/10 min at 230° C./2.16 kg, and was extruded on a line devoted to the production of ultrafine fibers, usually called melt-blown fibers.

The blend was extruded according to a temperature profile of from 220° C. to 300° C., producing remarkably stable micro-fibers having a melt flow index higher than 200, at 177° C./2.16 kg. In addition to the high regularity of fiber produced, it was unexpectedly discovered that the flow rate obtained using the blend is more than 10% higher than the best flow rate obtained by using a blend of the same isotactic polypropylene with the same amount of the same peroxide.

EXAMPLE 5

The same surprising results were obtained by using, in the process of Example 4, the blend of isotactic polypropylene, atactic polypropylene and peroxide described in Example 3.

What is claimed is:

1. A process for incorporating an organic peroxide prodegradent into an isotactic polypropylene homopolymer such that said prodegradent agent is substantially incorporated into the isotactic polypropylene homopolymer intact, said process comprising the steps of:

(i) preparing an initial homogeneous blend consisting of isotactic polypropylene homopolymer and 5 to 65% of atactic polypropylene;

(ii) introducing into a mixing means the blend of step (i) simultaneously with an organic peroxide prodegradent agent to form a second homogeneous bend;

(iii) extruding the blend of step (ii), and (iv) forming the extruded blend of step (iii)into polypropylene pellets that include a substantial portion of the prodegradent agent blended in step (ii).

2. The process of claim 1, wherein the initial homogeneous blend comprises from about 5 to about 50% atactic polypropylene.

3. The process of claim 1, wherein said prodegradent agent is present in an amount in the range of about 0.01 to about 20% by weight based on the total weight of said initial homogeneous blend.

4. The process of claim 3, comprising simultaneously introducing into an extruder the initial homogeneous blend of isotactic polypropylene homopolymer and atactic polypropylene with a prodegradent agent in an amount in the range of about 10 to about 20% by weight based on the total weight of said initial homogeneous blend.

5. The process of claim 3, wherein said prodegradent agent has a half-life in the range of about 1 to about 5 minutes at 170° C.

6. The process of claim 3, wherein the extrusion of the polymers and the prodegradent agent is conducted at a temperature in the range of about 130 to about 165 C for a residence time in the extruder of about 90 seconds.

7. The process of claim 3, wherein the prodegradent agent is selected from the group consisting of:
2,5-dimethyl-2,5-bis(t-butylperoxy)-hexyne-3; 4-methyl-4-t-butylperoxy-2-pentanone; 3,6,6,9,9-pentamethyl-3-(ethyl acetate)-1,2,4,5-textraoxycyclononane; 2,5-dimethyl-2,5-bis-(t-butylperoxy)-hexane; and 1-3-bis-(tert-butylperoxyisopropyl)-benzene.

8. The process of claim 3, wherein the prodegradent agent is selected from the group consisting of: 2,5-dimethyl-2,5-bis-(tert-butylperoxy)-hexyne-3 and 3,6,6,9,9-pentamethyl-3-(ethyl acetate)-1,2,4,5-tetraoxycyclononane.

9. The process of claim 2, comprising simultaneously introducing into an extruder the initial homogeneous blend of isotactic polypropylene homopolymer and atactic polypropylene with said prodegradent agent in an amount in the range of about 10 to about 20% by weight based on the total weight of said initial homogeneous blend.

10. The process of claim 9, wherein the prodegradent agent has a half-life in the range of about 1 to about 5 minutes at 170 C.

11. The process of claim 9 wherein the extrusion of the polymers and the prodegradent agent is conducted at a temperature in the range of about 130 to about 165° C. for a residence time in the extruder of about 90 seconds.

12. The process of claim 9, wherein the prodegradent agent is selected from the group consisting of:
2,5-dimethyl-2,5-bis(t-butylperoxy)-hexyne-3; 4-methyl-4-t-butylperoxy-2-pentanone; 3,6,6,9,9-pentamethyl-3-(ethyl acetate)-1,2,4,5-textraoxycyclononane; 2,5-dimethyl-2,5-bis-(t-butylperoxy)-hexane; and 1-3-bis-(tert-butylperoxyisopropyl)-benzene.

13. The process of claim 9, wherein the prodegradent agent is selected from the group consisting of: 2,5-dimethyl-2,5-bix-(tert-butylperoxy)-hexyne-3 and 3,6,6,9,9-pentamehyl-3-(ethyl acetate)-1,2,4,5-tetraoxycyclononane.

14. The process of claim 1 wherein the formed pellets contain said prodegradent agent in an amount greater than 10% by weight based on the total weight of said initial homogeneous blend, and said pellets are subsequently extruded under conditions causing the prodegradent therein to substantially completely react, thereby producing a polypropylene particularly suitable for fiber or fiber formation.

* * * * *